United States Patent
Kakehi et al.

(10) Patent No.: US 6,614,621 B2
(45) Date of Patent: Sep. 2, 2003

(54) METHOD OF MAKING THIN FILM MAGNETIC HEAD HAVING UPPER AUXILLARY MAGNETIC POLE OF ACCURATELY SET THICKNESS

(75) Inventors: Masahiro Kakehi, Kawasaki (JP); Hiroshi Maeda, Kawasaki (JP); Takashi Sekikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/005,011

(22) Filed: Dec. 4, 2001

(65) Prior Publication Data

US 2002/0044380 A1 Apr. 18, 2002

Related U.S. Application Data

(63) Continuation of application No. PCT/JP99/03144, filed on Jun. 14, 1999.

(51) Int. Cl.[7] .............................................. G11B 5/147
(52) U.S. Cl. ....................................................... 360/126
(58) Field of Search ................................ 360/126, 123

(56) References Cited

U.S. PATENT DOCUMENTS 5,452,164 A    9/1995  Cole et al.
6,388,845 B1 * 5/2002  Sasaki .......................... 360/126

FOREIGN PATENT DOCUMENTS

| JP | 6-195634 | 7/1994 |
| JP | 7-225917 | 8/1995 |
| JP | 7-272211 | 10/1995 |
| JP | 8-102014 | 4/1996 |
| JP | 9-270105 | 10/1997 |
| JP | 11-126312 | 5/1999 |

* cited by examiner

Primary Examiner—Robert S. Topper
(74) Attorney, Agent, or Firm—Greer, Burns & Crain, LTD.

(57) ABSTRACT

An upper auxiliary magnetic pole is formed in a space on a lower magnetic pole layer. A first insulating layer is then formed over the surface of the lower magnetic pole layer. The upper auxiliary magnetic pole is embedded within a swell formed on the surface of the first insulating layer. A second insulating layer is then formed over the surface of the first insulating layer. The second insulating layer has a property less abrasive than the first insulating layer. The second insulating layer is subjected to grinding over a wider area just after the swell has completely been removed. The abrasion can be suppressed at the thin film magnetic head in which the swell has been removed. The first insulating layer of a predetermined thickness reliably remains in each of the thin film magnetic heads on the wafer. An accurate adjustment of the thickness of the first insulating layer leads to a reliable establishment of a predetermined thickness in the upper auxiliary magnetic pole with less error.

10 Claims, 5 Drawing Sheets

METHOD OF MAKING THIN FILM MAGNETIC HEAD HAVING UPPER AUXILLARY MAGNETIC POLE OF ACCURATELY SET THICKNESS

This is a continuation of PCT/JP99/01344 filed on Jun. 14, 1999.

BACKGROUND OF THE INVENTION

1. Field of the Invention

The present invention relates to a thin film magnetic head in general employed in a magnetic recording medium drive such as a magnetic disk drive, a magnetic tape drive, and the like. In particular, the invention relates to a thin film magnetic head comprising an upper auxiliary magnetic pole raised from the lower surface of an upper magnetic pole layer toward a lower magnetic pole layer, and to a method of making such a magnetic thin film head.

The thin film magnetic head of this type may be utilized in combination with a read head such as a giant magnetoresistive (GMR) element or the like, or may be utilized to read magnetic information data by itself.

2. Description of the Prior Art

The front ends of an upper and a lower magnetic pole layer cooperate with each other so as to define a write gap therebetween. The write gap serves to cause a magnetic field for recordation leaking out of a medium-opposed surface or bottom surface of a head slider. The width of the write gap determines the width of a recording track established on a magnetic recording medium. If the width of the front ends of the upper and lower magnetic pole layers can be reduced, the width of a recording track can be reduced. Accordingly, the density of recordation can be improved in the magnetic recording medium. Employment of a smaller upper auxiliary magnetic pole raised from the upper magnetic pole layer toward the lower magnetic pole layer is believed to reduce the substantial width of the write gap. Employment of a smaller lower auxiliary magnetic pole raised from the lower magnetic pole layer toward the upper magnetic pole layer is also believed to reduce the substantial width of the write gap. The upper and lower auxiliary magnetic poles are believed to greatly contribute to reduction in the width of a recording track over a magnetic recording medium. The density of recordation is thus supposed to get improved.

In general, a peak of the intensity can be observed in the magnetic field for recordation at the write gap in a thin film magnetic head. The aforementioned upper auxiliary magnetic pole induces sub-peaks of the intensity in the magnetic field at the edges of the upper magnetic pole layer laterally projecting from the upper auxiliary magnetic pole in the lateral direction of a recording track. The sub-peaks of the intensity at the edges of the upper magnetic pole layer leads to increase in the width of a recording track, reverse of the magnetization in the adjacent recording tracks, or the like. Unless the sub-peaks at the edges are reduced enough, it is impossible to realize an improved density of recordation over a magnetic recording medium.

In order to minimize the aforementioned drawback, the upper auxiliary magnetic pole should be shortened in the longitudinal direction of a recording track. In other words, the thickness of the upper auxiliary magnetic pole extending between the upper and lower magnetic pole layers has to be set at a predetermined value, possibly without an error. Heretofore, a method of making a thin film magnetic head has not been established to reliably controlling the thickness of the upper auxiliary magnetic pole. In particular, when a plurality of thin film magnetic heads are to be formed on a single wafer, a flattening treatment by a simultaneous grinding cannot establish a predetermined thickness in the upper auxiliary magnetic pole of every thin film magnetic head on the wafer.

SUMMARY OF THE INVENTION

It is accordingly an object of the present invention to provide a method of making a thin film magnetic head reliably establishing a predetermined thickness or height of a component without an error in the thin film magnetic head through a flattening treatment. In particular, it is an object of the present invention to provide a thin film magnetic head contributing to establishment of a predetermined thickness or height of a component without an error in the group of the thin film magnetic heads subjected to a simultaneous flattening treatment, as well as a method of making the same.

According to the present invention, there is provided a method of making a thin film magnetic head, comprising: forming a material piece standing in a space on the surface of a first material layer; forming a second material layer over the surface of the first material layer; forming a third material layer over the surface of the second material layer, said third material layer being less abrasive than the second material layer; and subjecting the third material layer to a flattening treatment until the material piece, embedded in the second material layer, gets exposed.

When the surface of the first material layer is covered with the second material layer, the material piece standing in a space on the first material layer is embedded within a swell formed on the surface of the second material layer. When the second material layer is thereafter subjected to the flattening treatment, such as grinding, the material piece gets worn off from the top along with the swell. The material piece is allowed to finally get exposed out of the surface of the second material layer. An accurate adjustment of the thickness of the second material layer leads to a reliable establishment of a predetermined thickness or height in the material piece with less error.

In general, a plurality of thin film magnetic heads are formed on a single wafer. It is difficult to establish a constant rate of abrasion for every thin film magnetic head on the wafer in the grinding. In this invention, the third material layer less abrasive than the second material layer is subjected to the grinding over a wider area just when the swell has completely been removed. Accordingly, the abrasion can be suppressed at the thin film magnetic head in which the swell has been removed, even when the other swells still exist on the wafer. In this manner, the third material layer can be utilized to hinder the abrasion in each of the thin film magnetic heads. The second material layer of a predetermined thickness reliably remains in each of the thin film magnetic heads on the wafer.

The method of making may be employed to form a thin film magnetic head comprising an upper auxiliary magnetic pole swelling from the lower surface of an upper magnetic pole layer, for example. In this case, the method may comprise: forming an upper auxiliary magnetic pole standing in a space on the surface of a lower magnetic pole layer; forming a first insulating layer over the surface of the lower magnetic pole layer; forming a second insulating layer over the surface of the first insulating layer, said second insulating layer being less abrasive than the first insulating layer; and subjecting the second insulating layer to a flattening treatment until the upper auxiliary magnetic pole, embedded in the first insulating layer, gets exposed.

When the surface of the lower magnetic pole layer is covered with the first insulating layer, the upper auxiliary magnetic pole standing in a space on the lower magnetic pole layer is embedded within a swell formed on the surface of the first insulating layer. When the first insulating layer is thereafter subjected to the flattening treatment, such as grinding, the upper auxiliary magnetic pole gets worn off from the top along with the swell. The upper auxiliary magnetic pole is allowed to finally get exposed out of the surface of the first insulating layer. An accurate adjustment of the thickness of the first insulating layer leads to a reliable establishment of a predetermined thickness in the upper auxiliary magnetic pole with less error. In addition, the second insulating layer less abrasive than the first insulating layer is subjected to the grinding over a wider area just when the swell has completely been removed in the same manner as described above. Accordingly, the abrasion can be suppressed at the thin film magnetic head in which the swell has been removed, even when the other swells still exist. In this manner, the first insulating layer of a predetermined thickness reliably remains in each of the thin film magnetic heads on the wafer.

The method of making may provide a thin film magnetic head comprising: an upper magnetic pole layer; a lower magnetic pole layer; a first insulating layer superposed over the surface of the lower magnetic pole layer between the upper and lower magnetic pole layers; and a second insulating layer disposed between the first insulating layer and the upper magnetic pole layer. The second insulating layer may have a property less abrasive than the first insulating layer. Since the aforementioned grinding is effected on the second insulating layer, a flattened surface can be defined between the second insulating layer and the upper magnetic pole layer.

Likewise, the method of making may provide a thin film magnetic head comprising: an upper magnetic pole layer extending rearward from its front end over a flattened surface; a lower magnetic pole layer extending rearward from its front end below the flattened surface; a non-magnetic gap layer interposed between the front ends of the upper and lower magnetic pole layers; a first insulating layer superposed over the surface of the lower magnetic pole layer between the upper and lower magnetic pole layers; and a second insulating layer superposed over the surface of the first insulating layer and defining the flattened surface. The second insulating layer may have a property less abrasive than the first insulating layer.

The thin film magnetic head may be employed tin a magnetic disk drive such as a hard disk drive (HDD), a magnetic tape drive comprising a magnetic recording tape as a magnetic recording medium, and the other types of a magnetic recording medium drive.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
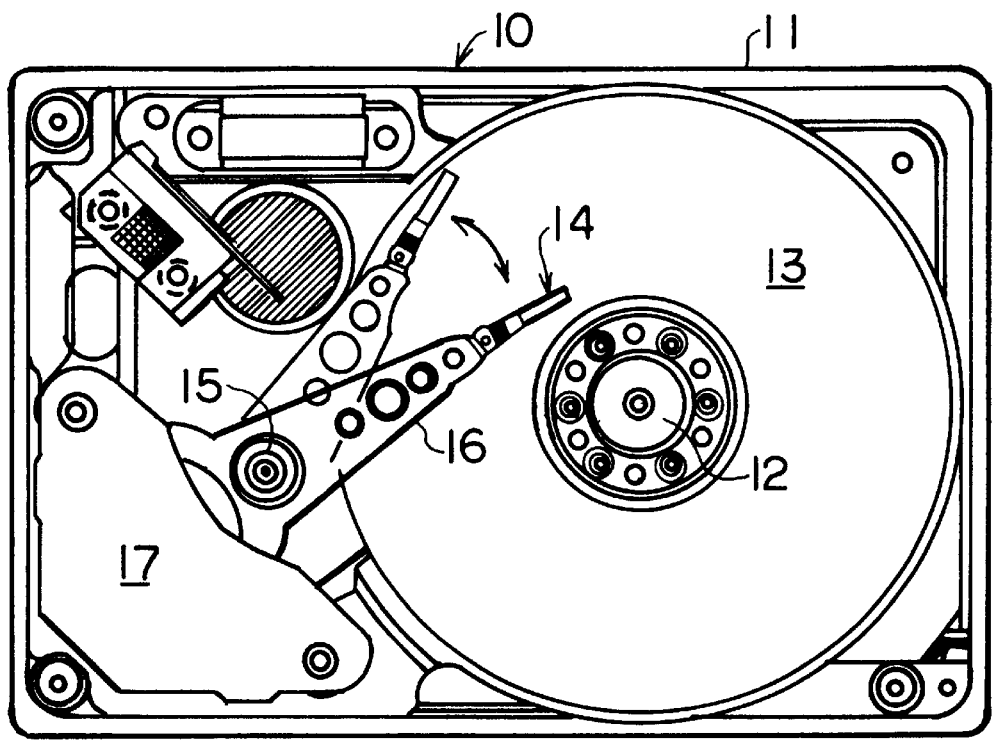
FIG. 1 is a plan view schematically illustrating the structure of a hard disk drive (HDD)

FIG. 1 schematically illustrates the inner structure of a hard disk drive (HDD) 10 as an example of a recording medium drive or storage device. The HDD 10 includes an enclosure 11 accommodating at least one magnetic recording disk 13. The magnetic recording disk 13 is mounted on a driving shaft of a spindle motor 12. A flying head slider 14 is also accommodated in the enclosure 11. The flying head slider 14 is allowed to get opposed to the surface of the magnetic recording disk 13. The flying head slider 14 is fixed on the tip end of a carriage arm 16. The carriage arm 16 is allowed to swing about a support shaft 15. When information data is to be written into or read out of the magnetic recording disk 13, an actuator 17 comprising a magnetic circuit, such as a voice coil motor, serves to drive the carriage arm 16 for swinging movement so as to position the flying head slider 14 right above a target recording track on the magnetic recording disk 13. A cover, not shown, is coupled to the enclosure 11 so as to establish an air-tight space inside.

Figure 2:
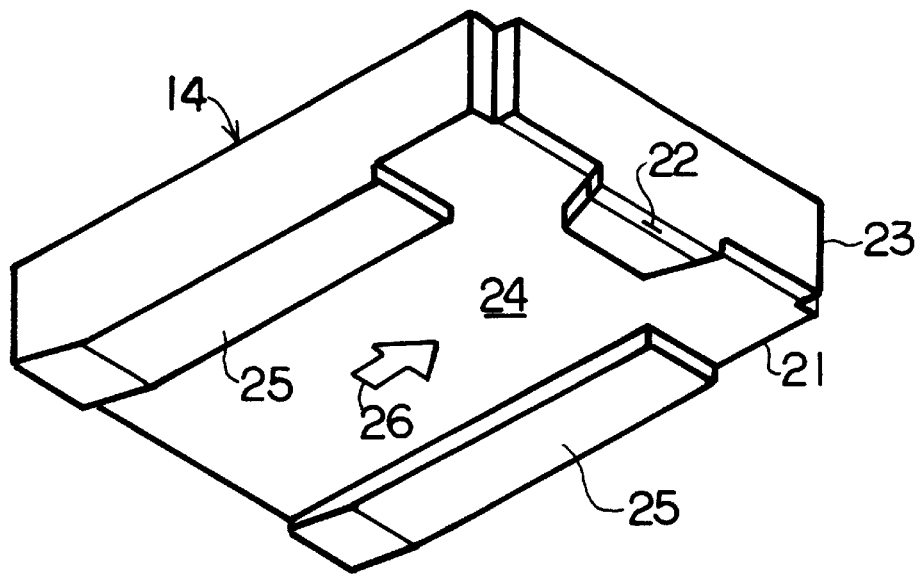
FIG. 2 is an enlarged perspective view illustrating a specific example of a flying head slider.

FIG. 2 illustrates a specific example of the flying head slider 14. The flying head slider 14 of this type includes a slider body 21 made of $Al_2O_3$-TiC, and a head containing layer 23 coupled to the trailing or downstream end of the slider body 21. The head containing layer 23 may be made of $Al_2O_3$. A read/write electromagnetic transducer 22 is embedded in the head containing layer 23. A medium-opposed surface or bottom surface 24 is defined continuously over the slider body 21 and the head containing layer 23 so as to face the surface of the magnetic recording disk 13 at a distance. A pair of rails 25 are formed to extend over the bottom surface 24 from the leading or upstream end toward the trailing end. The individual rail 25 is designed to define an air bearing surface (ABS) at its top surface. The bottom surface 24 is designed to receive an airflow 26, generated along the surface of the rotating magnetic recording disk 13, in particular, at the air bearing surfaces, so as to cause a lift of the flying head slider 14. The flying head slider 14 is thus allowed to fly above the surface of the rotating magnetic recording disk 13.

Figure 3:
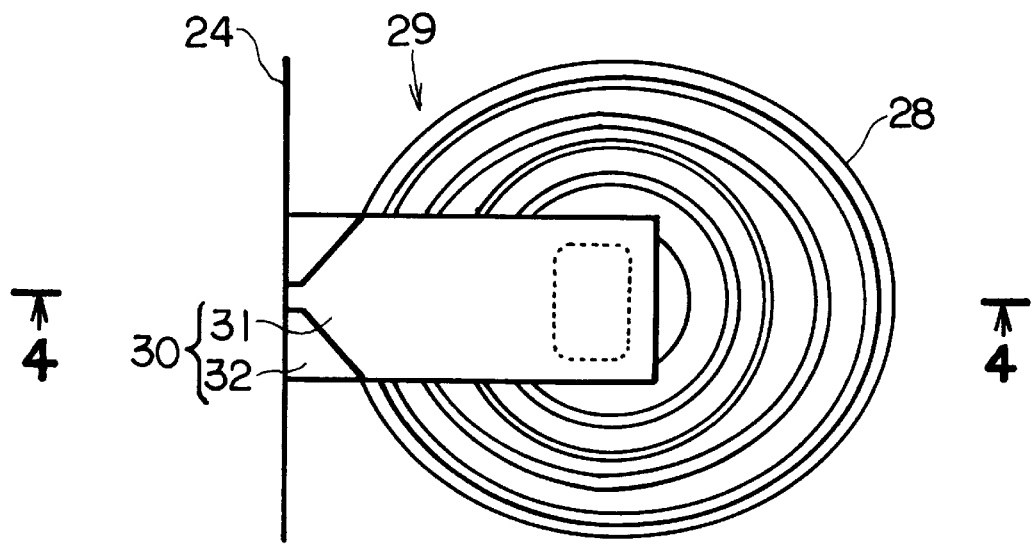
FIG. 3 is a plan view schematically illustrating the structure of a thin film magnetic head.

As shown in FIG. 3 in detail, the read/write electromagnetic transducer 22 includes an inductive write element or a thin film magnetic head 29 according to the present invention. The thin film magnetic head 29 is designed to utilize a magnetic field induced at a conductive swirly coil pattern 28 so as to record magnetic binary data into the magnetic recording disk 13. When a magnetic field is induced at the swirly coil pattern 28 in response to supply of an electric current, a magnetic flux is allowed to circulate through a magnetic core 30 penetrating through the swirly coil pattern 28 at its central position.

Figure 4:
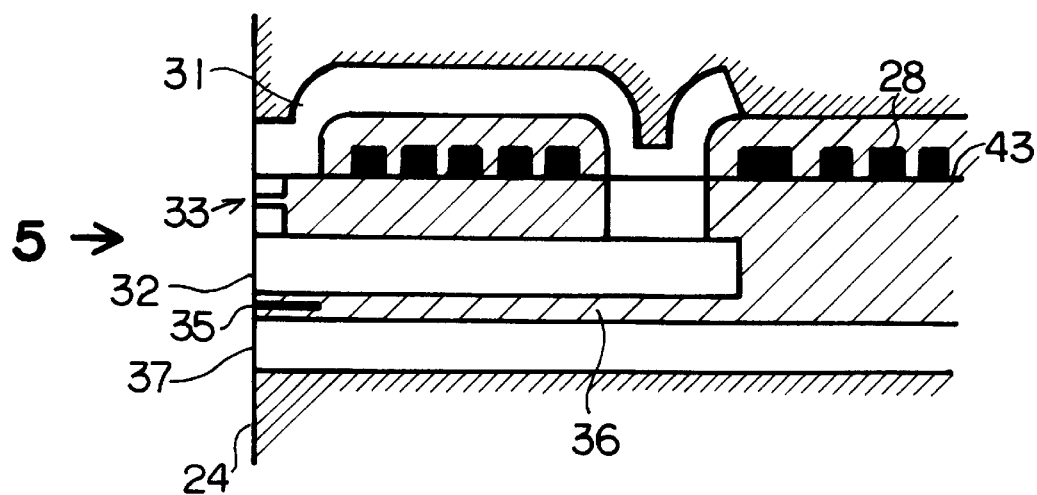
FIG. 4 is a sectional view taken along the line 4—4 in FIG. 3.

Referring also to FIG. 4, the magnetic core 30 includes an upper magnetic pole layer 31 exposed at the bottom surface 24, and a lower magnetic pole layer 32 likewise exposed at the bottom surface 24. The upper and lower magnetic pole layers 31, 32 are connected to each other at the center of the swirly coil pattern 28. The upper and lower magnetic pole layers 31, 32 are designed to expose the tip ends, respectively, at the bottom surface 24. A non-magnetic gap layer 33 is interposed between the tip ends of the upper and lower magnetic pole layers 31, 32. The magnetic flux circulating through the upper and lower magnetic pole layers 31, 32 is allowed to get around the non-magnetic gap layer 33 at the bottom surface 24. A magnetic field is thus allowed to leak out of the bottom surface 24. The leaking magnetic field serves to magnetize the opposed magnetic recording disk 13. The upper and lower magnetic pole layers 31, 32 may be made of NiFe, for example.

The read/write electromagnetic transducer 22 further includes a read head, namely, a magnetoresistive (MR) element 35. The MR element 35 is embedded in an $Al_2O_3$ layer 36 interposed between a lower shield layer 37, made of FeN or NiFe, and the lower magnetic pole layer 32. Here, the lower magnetic pole layer 32 also functions as an upper shield layer for the MR element 35. Accordingly, the lower magnetic pole layer 32 is designed to extend over a wider range than the upper magnetic pole layer 31 at the tip ends thereof exposed at the bottom surface 24, as shown in FIG. 3, for example. The MR element 35 may be replaced with a giant magnetoresistive (GMR) element or the like. Otherwise, the thin film magnetic head 29 may be employed without any additional read element.

Figure 5:
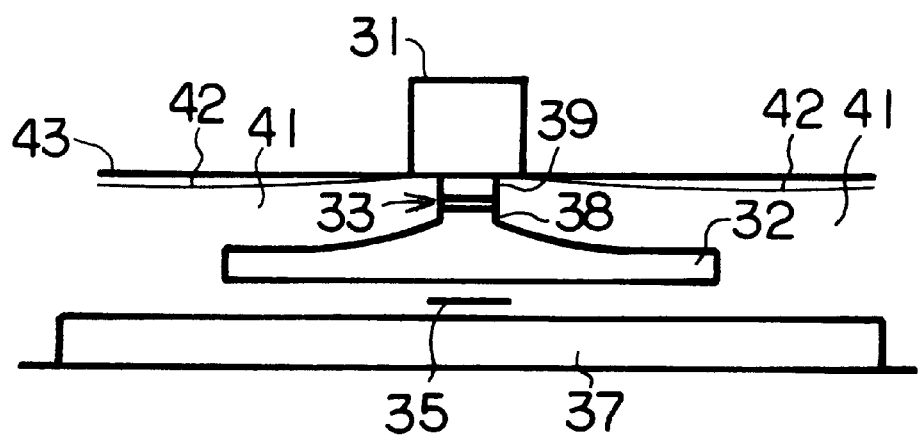
FIG. 5 is a front view illustrating the bottom surface from the viewpoint depicted by the arrow 5 in FIG. 4.

Referring also to FIG. 5, a lower auxiliary magnetic pole 38 is formed to swell from the upper surface of the lower magnetic pole layer 32 toward the upper magnetic pole layer 31 at the tip end of the lower magnetic pole layer 32. The lower auxiliary magnetic pole 38 may be integral to the lower magnetic pole layer 32. On the other hand, an upper auxiliary magnetic pole 39 is formed to swell from the lower surface of the upper magnetic pole layer 31 toward the lower magnetic pole layer 32. The upper auxiliary magnetic pole 39 gets opposed to the lower auxiliary magnetic pole 38. The upper auxiliary magnetic pole 39 may be formed as a small magnetic piece separate from the upper magnetic pole layer 31. The upper and lower auxiliary magnetic poles 39, 38 serve to define the non-magnetic gap layer 33 of a smaller width.

The non-magnetic gap layer 33 of a smaller width determines the width of a recording track established on the surface of the magnetic recording disk 13. The width of a recording track can be reduced as compared with the case where the non-magnetic gap layer 33 is simply defined between the upper and lower magnetic pole layers 31, 32. The increased number of the recording tracks can be established in a unit length along the radial direction of the magnetic recording disk 13. The density of recordation can thus be improved.

Referring again to FIG. 5, a first insulating layer 41 is superposed over the upper surface of the lower magnetic pole layer 32 between the lower and upper magnetic pole layers 32, 31. A second insulating layer 42 is superposed over the upper surface of the first insulating layer 41 between the first insulating layer 41 and the upper magnetic pole layer 31. A flattened surface 43 is defined at the boundary between the second insulating layer 42 and the upper magnetic pole layer 31. The aforementioned swirly coil pattern 28 is formed to extend over the flattened surface 43.

Here, the second insulating layer 42 is made of a material which is less abrasive than that of the first insulating layer 41. The material may be represented by a transparent inorganic oxide such as $Al_2O_3$ or $SiO_2$ or a transparent inorganic nitride such as $Si_3N_4$ or AlN. The transparency of the material enables a reliable observation of a positioning marker disposed below the first and second insulating layers 41, 42. The upper magnetic pole layer 31 as well as the swirly coil pattern 28 cannot be formed on the upper auxiliary magnetic pole 39 and the second insulating layer 42 substantially without the positioning marker.

When the first insulating layer 41 is made of $Al_2O_3$, the second insulating layer 42 may be an $Si_3N_4$ layer of the thickness ranging from 0.05 $\mu$m to 1.0 $\mu$m, for example. If an $Al_2O_3$ layer and an $Si_3N_4$ layer are simultaneously subjected to grinding under the identical condition of grinding, the $Al_2O_3$ layer can be worn off five to seven times faster than the $Si_3N_4$ layer. Specifically, while a predetermined thickness of the $Si_3N_4$ layer is worn off, five to seven times the predetermined thickness of the $Al_2O_3$ can be worn off. It should be noted that the rate of abrasion for the second insulating layer 42 may be set at least one third the rate of the abrasion for the first insulating layer 41.

Figure 6:
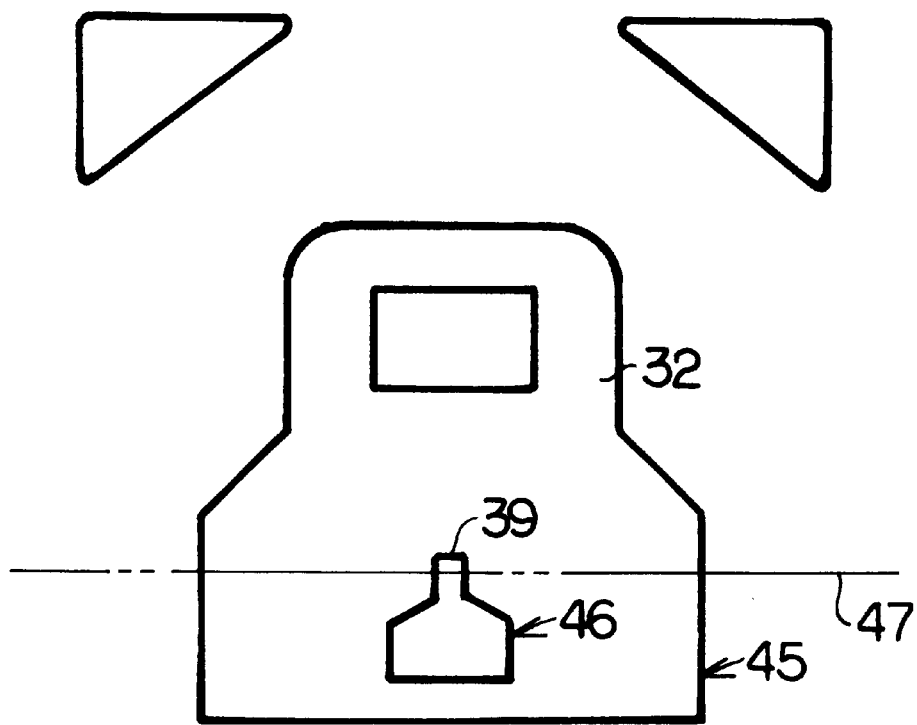
FIG. 6 is an enlarged plan view illustrating the thin film magnetic head on a wafer in the process of formation.

Next, a description will be made on a method of making the thin film magnetic head 29. First of all, as shown in FIG. 6, a first material layer 45 is formed to extend over an $Al_2O_3$-TiC wafer. The first material layer 45 is designed to form the lower magnetic pole layer 32. The first material layer 45 is layered over the surface of the $Al_2O_3$ layer 36 in which the MR element 35 has been embedded.

A non-magnetic layer, not shown, is then formed to extend over the upper surface of the first material layer 45. The non-magnetic gap layer 33 is to be shaped out of the non-magnetic layer. A material piece 46 is then formed on the non-magnetic layer. The magnetic piece 46 is designed to provide the upper auxiliary magnetic pole 39. A plating or electrodeposition process may be employed to form the material piece 46, for example. When the wafer is finally subjected to grinding process at a datum line 47, the lower magnetic pole layer 32 and the upper auxiliary magnetic pole 46 are allowed to appear out of the first material layer 45 and the material piece 46, respectively,. The datum line 47 determines the bottom surface 24 of the flying head slider 14.

Figure 7A:
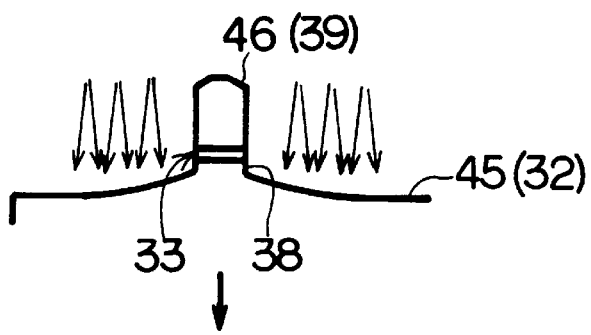
FIGS. 7A–7D illustrate the process of forming the upper auxiliary magnetic pole according to a specific example.

When ion milling is effected, utilizing the material piece 46 as a mask, the non-magnetic gap layer 33 and the lower auxiliary magnetic pole 38 are shaped, as shown in FIG. 7A. The non-magnetic gap layer 33 and the lower auxiliary magnetic pole 38 have the contour or shape identical to that of the material piece 46. The material piece 46 is thus allowed to stand in a space on the first material layer 45. In other words, the upper auxiliary magnetic pole 39 is provided to stand in a space on the lower magnetic pole layer 32.

Figure 7B:
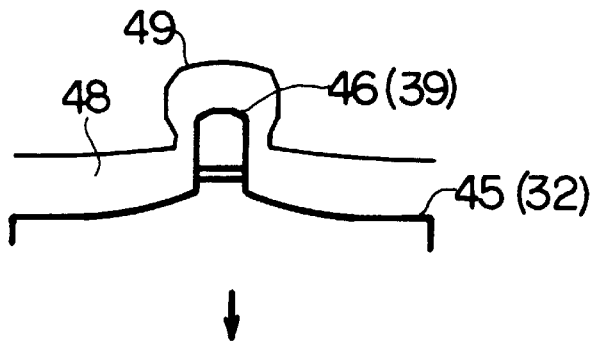

As shown in FIG. 7B, a second material layer, namely, an $Al_2O_3$ overcoat 48 is thereafter formed to extend over the upper surface of the first material layer 45. In this case, the $Al_2O_3$ overcoat 48 corresponds to the first insulating layer 41. Sputtering may be employed to form the $Al_2O_3$ overcoat 48, for example. $Al_2O_3$ particles are allowed to uniformly fall on the surface of the first material layer 45. The material piece 46 standing above the first material layer 45 is thus embedded within a swell 49 of the $Al_2O_3$ overcoat 48.

Figure 7C:
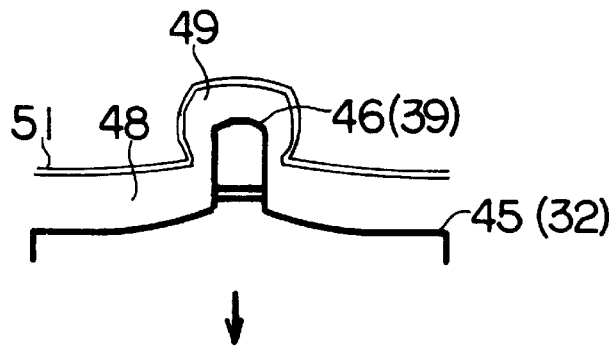

As shown in FIG. 7C, the third material layer, namely, an $Si_3N_4$ overcoat 51 is thereafter formed to extend over the upper surface of the $Al_2O_3$ overcoat 48. The $Si_3N_4$ overcoat 51 corresponds to the second insulating layer 42. The $Si_3N_4$ overcoat 51 has a property less abrasive than the $Al_2O_3$ overcoat 48. Sputtering may likewise be employed to form the $Si_3N_4$ overcoat 51, for example.

Figure 7D:
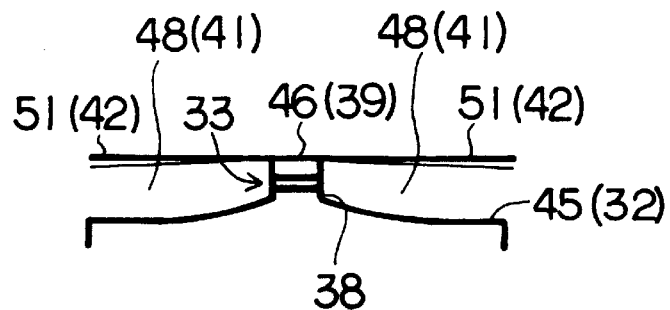

Thereafter, the $Si_3N_4$ overcoat 51 is subjected to a flattening treatment by grinding. The material piece 46 in the swell 49 is gradually worn off from the top. The material piece 46, namely, the upper auxiliary magnetic pole 39 is finally allowed to get exposed out of the $Si_3N_4$ overcoat 51 as well as the $Al_2O_3$ overcoat 48, as shown in FIG. 7D. The wafer may be urged against a faceplate in the grinding. Tiny diamond particles embedded on the surface of the faceplate serve to wear off the surface of the wafer, for example.

In general, a plurality of thin film magnetic heads 29 are formed on the surface of a single wafer. It is difficult to establish a constant rate of abrasion for every thin film magnetic head 29 on the wafer in the grinding. In this embodiment, the $Si_3N_4$ overcoat 51 comes to contact the surface of the faceplate over a wider area just when the swell 49 has completely been removed. Accordingly, the abrasion can be suppressed at the thin film magnetic head 29 in which the swell 49 has been removed, even when the other swells 49 still exist. In this manner, the $Si_3N_4$ overcoat 51 can be utilized to hinder the abrasion in each of the thin film magnetic heads 29. The $Al_2O_3$ overcoat 48 of a predetermined thickness reliably remains in each of the thin film magnetic heads 29 on the wafer. The $Al_2O_3$ overcoats 48 of the accurately set thickness in this manner lead to establishment of the upper auxiliary magnetic poles 39 of a uniform thickness all over the wafer.

The swirly coil pattern 28 as well as the upper magnetic pole layer 31 is thereafter formed on the flattened surface 43 of the $Si_3N_4$ overcoat 51. The swirly coil pattern 28 can finely be formed on the flattened surface 43 defined over the $Si_3N_4$ overcoat 51 at a higher accuracy. In addition, since the swirly coil pattern 28 can be formed on the flattened surface 43, sputtering may be employed to form the swirly coil pattern 28. It leads to a great choice of the material for the swirly coil pattern 28.

When the flattening treatment by grinding is to be effected to form the upper auxiliary magnetic pole 39 in the aforementioned manner, the swell 49 may be covered with a resist film prior to the grinding, as shown in FIGS. 8A–8D. The resist film serves to keep the swell 49 exposed out of the $Si_3N_4$ overcoat 51 during the grinding. In this case, the flattening treatment can efficiently be effected, since the swell 49 without the $Si_3N_4$ overcoat 51 gets worn off faster than the swell 49 covered with the $Al_2O_3$ overcoat 48. It may contribute to reduction in the thickness of the $Si_3N_4$ overcoat 51, namely, the second insulating layer. It is also possible to vary the rate of abrasion, so that a widened choice of the material can be provided for the second insulating layer.

Figure 8A:
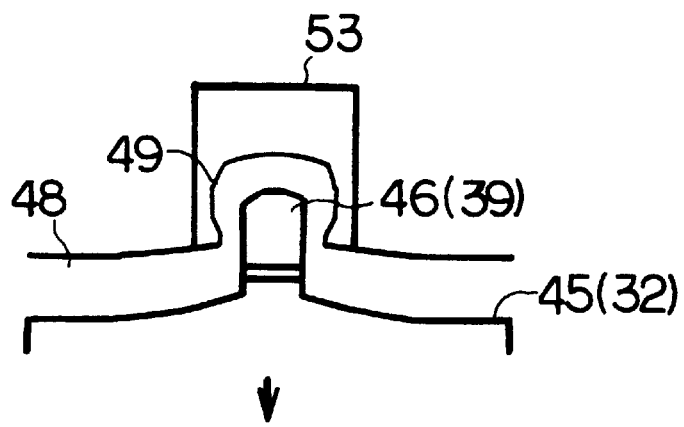
FIGS. 8A–8D illustrate the process of forming the upper auxiliary magnetic pole according to another specific example.

Specifically, after the $Al_2O_3$ overcoat 48 has been formed over the surface of the first material layer 45 as shown in FIG. 7B, the swell 49 on the surface of the $Al_2O_3$ overcoat 48 is covered with a resist film 53, as shown in FIG. 8A, for example. Photoresist may be employed to form the resist film 53, for example.

Figure 8B:
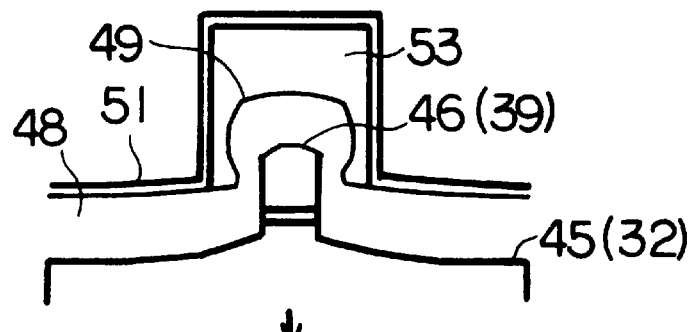
Figure 8C:
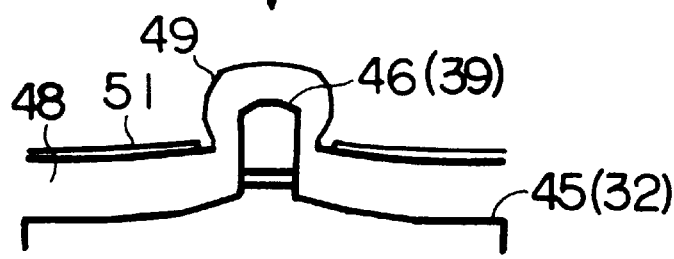

Thereafter, the $Si_3N_4$ overcoat 51 is formed on the surface of the $Al_2O_3$ overcoat 48 in the aforementioned manner, as shown in FIG. 8B. The resist film 53 on the swell 49 is covered with the $Si_3N_4$ overcoat 51. The resist film 53 is then removed, as shown in FIG. 8C. The $Si_3N_4$ overcoat 51 covering over the resist film 53 is also removed along with the resist film 53. The swell 49 is thus allowed to get exposed out of the $Si_3N_4$ overcoat 51 as well as the $Al_2O_3$ overcoat 48.

Figure 8D:
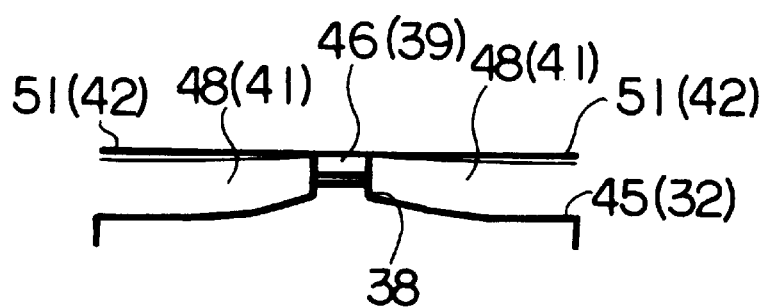

When the flattening treatment by grinding is effected on the swell 49 on the $Al_2O_3$ overcoat 48, the swell 49 is efficiently worn off as compared with the case where the swell 49 is covered with the $Si_3N_4$ overcoat 51. The flattening treatment can be expedited. As shown in FIG. 8D, the flattening treatment serves to expose the material piece 46, namely, the upper auxiliary magnetic pole 39 out of the $Al_2O_3$ overcoat 48.

The rate of abrasion for and the thickness of the second insulating layer may depend on the rate of abrasion for and the height of the swell 49. In addition, the condition of grinding may include the material of the abrasive agent, the size of the abrasive particles, the intensity of the force urging the wafer against the faceplate, the duration of the urging force, the relative velocity between the faceplate and the wafer, and the other related parameters.

The thin film magnetic head 29 may be applied not only to the flying head slider 14 in the above-described manner but also to a contact head slider keeping contacting the surface of the magnetic recording disk 13. The thin film magnetic head 29 may be employed in a magnetic disk drive such as the aforementioned hard disk drive 10, a magnetic tape drive comprising a magnetic recording tape as a magnetic recording medium, and the other types of a magnetic recording medium drive.

What is claimed is:

1. A thin film magnetic head comprising:
   a lower magnetic pole layer;
   a non-magnetic gap layer superposed over a surface of the lower magnetic pole layer;
   an upper auxiliary magnetic pole disposed on a surface of the non-magnetic gap layer;
   a first insulating layer superposed over the surface of the lower magnetic pole layer so as to surround the non-magnetic gap layer;
   a second insulating layer superposed over a surface of the first insulating layer so as to surround the upper auxiliary magnetic pole;
   an upper magnetic pole layer overlaid on the upper auxiliary magnetic pole; and
   a thin film coil magnetically coupled to the upper and lower magnetic pole layers, the coil being insulating from the upper and lower magnetic pole layers.

2. A magnetic recording medium drive including the thin film magnetic head as defined in claim 1.

3. The thin film magnetic head according to claim 1, wherein said second insulating layer is made of a material less abrasive than that of the first insulating layer.

4. A magnetic recording medium drive including the thin film magnetic head as defined in claim 3.

5. The thin film magnetic head according to claim 3, wherein a flattened surface is defined between the second insulating layer and the upper magnetic pole layer.

6. A magnetic recording medium drive including the thin film magnetic head as defined in claim 5.

7. A thin film magnetic head comprising:
   a lower magnetic pole layer extending rearward from its front end;
   a non-magnetic gap layer superposed over an upper surface of the front end of the lower magnetic pole layer;
   an upper auxiliary magnetic pole disposed on an upper surface of the non-magnetic gap layer;
   a first insulating layer superposed over the surface of the lower magnetic pole layer so as to surround the non-magnetic gap layer and the upper auxiliary magnetic pole;
   a second insulating layer superposed over a surface of the first insulating layer, upper surfaces of the second insulating layer and the upper auxiliary magnetic pole defining a flattened surface; and a thin film coil magnetically coupled to the upper and lower magnetic pole layers, the coil being insulated from the upper and lower magnetic pole layers.

8. A magnetic recording medium drive including the thin film magnetic head as defined in claim 7.

9. The thin film magnetic head according to claim 7, wherein said second insulating layer is made of a material less abrasive than that of the first insulating layer.

10. A magnetic recording medium drive including the thin film magnetic head as defined in claim 9.

* * * * *